United States Patent [19]

Rushby et al.

[11] 4,389,677

[45] Jun. 21, 1983

[54] METHOD AND APPARATUS FOR REMOVING ERRONEOUS ELEMENTS FROM DIGITAL IMAGES

[75] Inventors: Robert J. Rushby, Waterloo; Yashvant S. Parmar, Weston, both of Canada

[73] Assignee: NCR Canada Ltd - NCR Canada Ltee, Mississauga, Canada

[21] Appl. No.: 213,767

[22] Filed: Dec. 8, 1980

[51] Int. Cl.$^3$ .................. H04N 1/40; G06F 11/00
[52] U.S. Cl. ................................ 358/280; 358/284; 371/2; 371/27; 371/41
[58] Field of Search ................ 358/280, 282, 284; 371/2, 27, 30, 37, 41, 13, 38; 340/146.3 H

[56] References Cited

U.S. PATENT DOCUMENTS

| | | | |
|---|---|---|---|
| 3,624,606 | 11/1971 | Lefevre | 340/146.3 AG |
| 3,668,631 | 6/1972 | Griffith et al. | 371/41 |
| 3,700,797 | 10/1972 | Wernikoff | 178/6 |
| 3,713,097 | 1/1973 | Linnerooth et al. | 371/27 |
| 3,997,912 | 12/1976 | Zsagar | 358/78 |
| 4,003,024 | 1/1977 | Riganati | 340/146.3 H |
| 4,038,668 | 7/1977 | Quarton | 235/151 |
| 4,060,713 | 11/1977 | Golay | 364/416 |
| 4,175,692 | 11/1979 | Watanabe | 371/38 |

FOREIGN PATENT DOCUMENTS 2173465 9/1973 France.
2046051 11/1980 United Kingdom.

OTHER PUBLICATIONS

P. Stucki, "Efficient Transmission of Graphics Using Polyomino Filtering at the Receiver", IEEE Trans. on Aerospace and Electronic Systems, vol. AES-6, No. 6, Nov. 1970, pp. 811-814.

European Patent Office Public No. 0,005,954, William K. Pratt.

R. W. Hamming, "Error Detecting and Error Correcting Codes", Bell System Technical Journal, vol. 29, 4-50, pp. 147-160.

Primary Examiner—Robert L. Griffin
Assistant Examiner—Edward L. Coles
Attorney, Agent, or Firm—J. T. Cavender; Albert L. Sessler, Jr.; George Jameson

[57] ABSTRACT

A method and apparatus for removing erroneous data elements from digital images by systemically moving a window memory over the entire area of an image. Each data element in the image is examined with respect to neighboring elements by comparing the contents of the window with a set of masks to determine if a certain data element should be altered.

12 Claims, 18 Drawing Figures

DIRECTION OF SCAN

DIRECTION OF DOCUMENT TRAVEL

FIG. 7
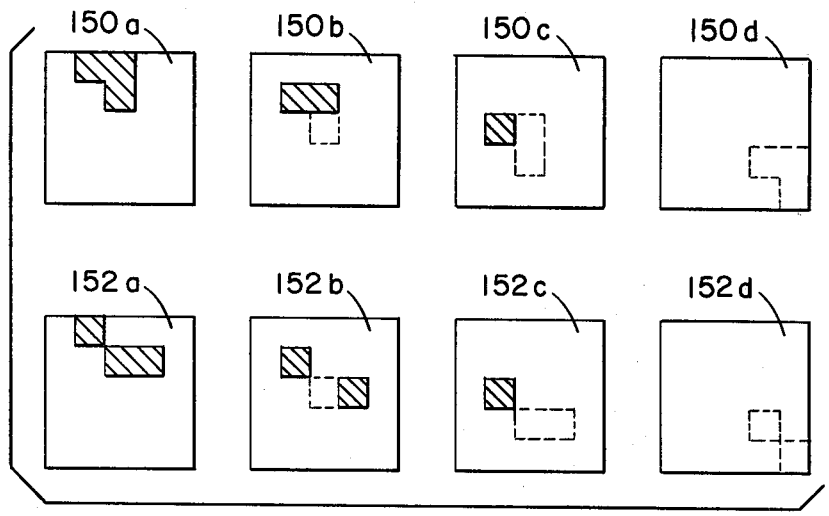
FIG. 4
| A1 | B1 | C1 | D1 | E1 |
|----|----|----|----|----|
| A2 | B2 | C2 | D2 | E2 |
| A3 | B3 | C3 | D3 | E3 |
| A4 | B4 | C4 | D4 | E4 |
| A5 | B5 | C5 | D5 | E5 |
FIG. 5
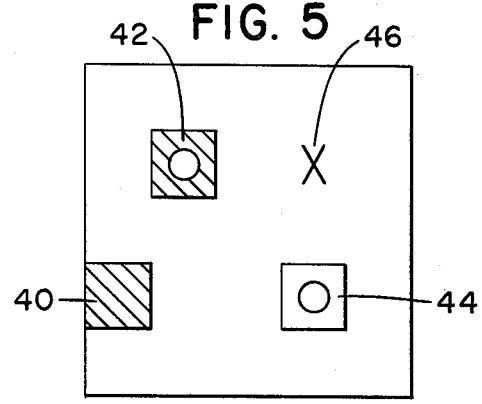

| INPUT FUNCT. | PRESENT STATE | | | NEXT STATE | | | NEXT STATE OUTPUTS | | |
|---|---|---|---|---|---|---|---|---|---|
| DVI | C | B | A | C' | B' | A' | RL | UMS | DVO |
| 1 | 0 | 0 | 0 | 0 | 0 | 0 | 0 | 1 | 1 |
| 0 | 0 | 0 | 0 | 0 | 0 | 1 | 0 | 1 | 0 |
| X | 0 | 0 | 1 | 0 | 1 | 0 | 1 | 1 | 0 |
| X | 0 | 1 | 0 | 0 | 1 | 1 | 0 | 0 | 0 |
| X | 0 | 1 | 1 | 1 | 0 | 0 | 0 | 0 | 0 |
| X | 1 | 0 | 0 | 1 | 0 | 1 | 0 | 0 | 0 |
| X | 1 | 0 | 1 | 1 | 1 | 0 | 0 | 1 | 0 |
| 0 | 1 | 1 | 0 | 1 | 1 | 0 | 0 | 1 | 0 |
| 1 | 1 | 1 | 0 | 1 | 1 | 1 | 0 | 1 | 1 |
| X | 1 | 1 | 1 | 0 | 0 | 0 | 0 | 1 | 1 |

FIG. 12

| MASK | FPLA 1 CONTENTS | | DATA (ACTIVE LOW) |
|---|---|---|---|
| | A1 A2 A3 A4 A5 B1 B2 B3 B4 B5 C1 C2 D1 D2 E1 E2 | | F0 F1 F2 F3 F4 F5 F6 |
| 70,78 | L L - - - L H L L - - - - - - - | | A . . . . . . |
| 96 | L L - - - L H L L - - - - - - - | | . . A . . . . |
| 86 | L L - - - L H L L L L L L L L L - | | . A . . . . . |

| MASK | FPLA 2 CONTENTS | | DATA (ACTIVE LOW) |
|---|---|---|---|
| | C3 C4 C5 D3 D4 D5 E3 E4 E5 F0 F1 F2 F3 F4 F5 F6 | | C3 D4 |
| 70 | H L - L L L - - - - L H H H H H | | A . |
| 78 | H L L L L L L L L - L H H H H H | | A A |
| 96 | H L - L - H L L L - H L L H H H | | A . |
| 86 | H H L L L L L L - - H L H H H H | | . A |

METHOD AND APPARATUS FOR REMOVING ERRONEOUS ELEMENTS FROM DIGITAL IMAGES

BACKGROUND OF THE INVENTION

This invention relates generally to a method and apparatus for processing digital images and, in particular, to a method and apparatus for removing random pixels resulting from noise generated by the thresholding operation from a multiple color scale to a two-level (black/white) representation during the development of a facsimile image.

When generating thresholded black and white facsimile images, electronic noise is often generated. Such noise is exhibited as holes or white spots in the middle of dark areas of a figure, single or small groups of black dots in white areas of an image, or unsmooth edges of figures. Noise increases the number of bits which must be transmitted to form a facsimile image. The noise itself does not contain any useful information; thus, by suppressing this noise, visual and machine pattern recognition are greatly aided. Furthermore, noise reduction improves data compression performance, since it improves the line-to-line correlation in its facsimile image, which is the basis of many compression methods. This improves correlation and also results in faster data transmission.

SUMMARY OF THE INVENTION

It is therefore an object of the present invention to provide a novel method and apparatus for removing random noise from digital images.

It is also an object of the present invention to provide a high speed, simple method for noise removal which can easily be implemented using low cost currently available electronic components.

It is a further object of the present invention to provide a noise removal system which can handle a large number of image patterns while necessitating a change in a minimal number of pixels, or picture elements.

It is a still further object of the present invention to provide a noise removal system which requires that only a section of the image be stored at any one time, rather than the entire image.

These and other objects are accomplished in the present instance by generating a memory area comprising a predetermined number of representations of adjoining picture elements, hereinafter called a "window", which is systematically moved over the entire area of the image. Every pixel in the image passes through all positions in the window area and is examined with respect to neighboring pixels by comparing each input window pattern against a set of "masks" to determine how the pixels in the window should be altered to suppress noise.

The noise cleaner in the present invention operates by applying the set of masks over the entire area of the image which is to be compressed. The image area examined should be large enough to examine the neighboring points around the pixels to be examined; for example, to examine an isolated pixel, all eight surrounding points or pixels must be available. It has been determined by experimentation that most image noise contains three pixels or less; therefore, a 5×5 matrix comprised of twenty-five picture points, or pixels, is required to effectively examine noise generated in document images. The 5×5 pixel matrix is formed by creating a tapped delay line, which is accomplished by simulating a shift register with control points that holds four image scan lines and the five latest pixels. From this long shift register of stored picture elements, fixed points are examined by Boolean logic equations implemented in a pair of field programmable logic arrays (FPLAs), the outputs of which dynamically modify the original data stream.

BRIEF DESCRIPTION OF THE DRAWINGS

FIG. 4 is a diagram showing the conventional labelling for the pixel matrix of the window memory unit;

FIG. 5 shows the symbols employed in the mask set of the preferred embodiment;

FIG. 7 shows several practical examples of the operation of the mask set utilized for pixel removal;

FIG. 12 is a chart listing several examples for coding the logic masks into Field Programmable Logic Array (FPLA) chips;

DETAILED DESCRIPTION OF THE PREFERRED EMBODIMENT

Figure 1:
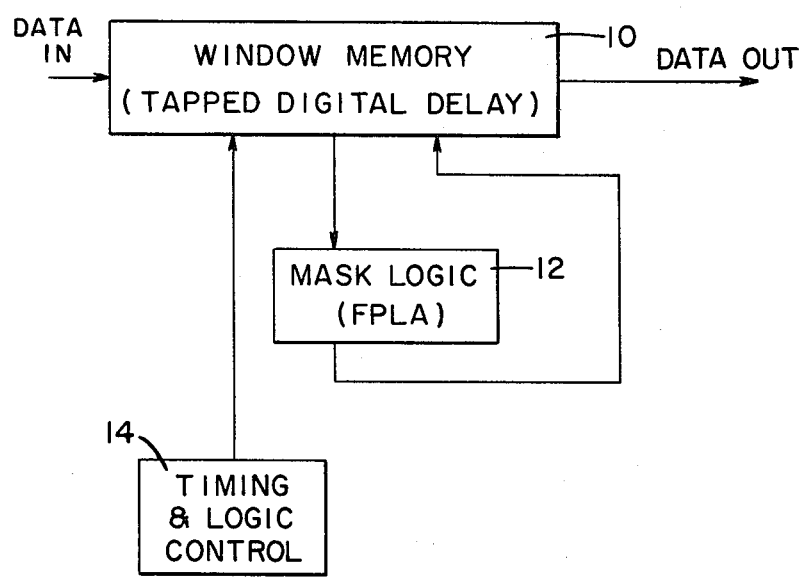
FIG. 1 is a block diagram of the preferred embodiment of the present invention.

A simplified block diagram of the noise cleaner of the present invention is shown in FIG. 1. Referring now to FIG. 1, a stream of pixels is transmitted serially to a window memory unit 10. Unit 10 forms the 5×5 pixel matrix used to examine the facsimile data for unwanted noise pixels. This twenty-five pixel matrix is transmitted to a mask logic unit 12. Unit 12 compares the matrix pixels to a series of masks, and determines which pixels, if any, should be altered to removed noise from the facsimile image. In the present embodiment, it has been determined that it is necessary to alter only the contents of two particular pixel positions at any time to remove unwanted pixels, as will subsequently be shown. The altered pixels are then transmitted back to window memory unit 10 to replace the corresponding original pixels in the pixel matrix. Unit 10 serially outputs a stream of cleaned pixels which is transmitted to a data compression unit (not shown) for transmission of the facsimile image. A timing and control unit 14 regulates the operation of window memory unit 10.

Figure 2:
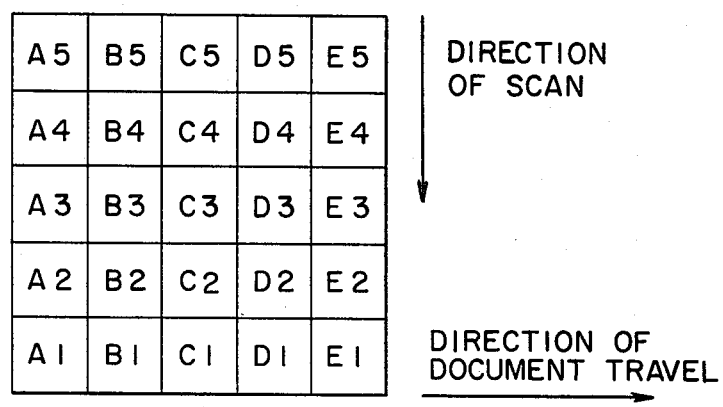
FIG. 2 is a diagram showing the actual organization of the pixel matrix of the window memory unit.

The actual organization of the 5×5 pixel matrix of window memory unit 10 is shown in FIG. 2. The twenty-five pixels, which are labelled A1–A5 through E1–E5 inclusive, are shown as they appear on the original image with respect to the direction of scanning by the image lift unit (not shown) and the direction of document travel. Thus, A1 is the newest pixel entering the matrix, while E5 is the oldest pixel contained.

Figure 3:
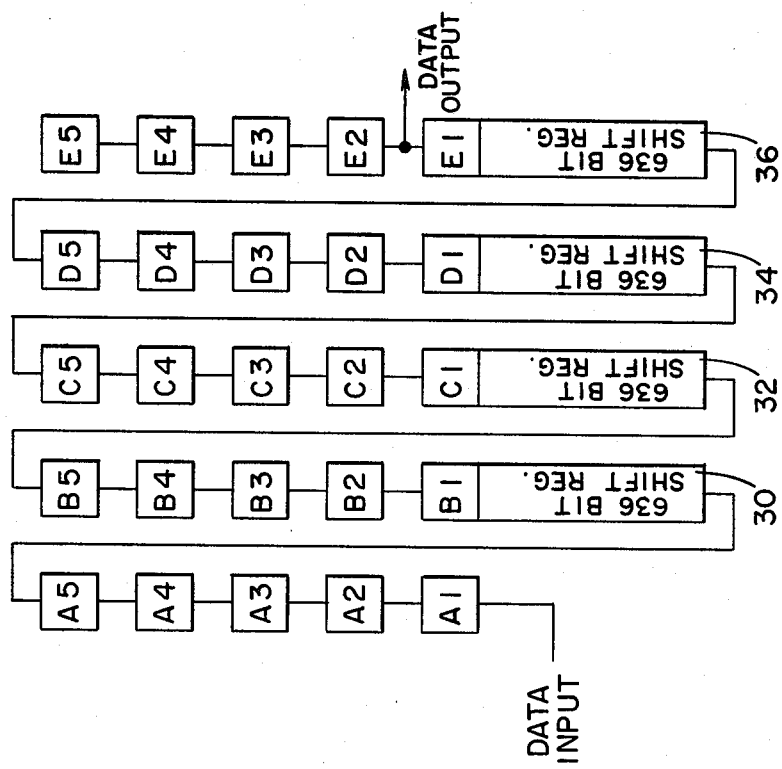
FIG. 3 shows circuitry for simulating the operation of the window memory unit.

A simulation diagram of the real image bit storage path for the 5×5 matrix of unit 10 is shown in detail in FIG. 3, in which the 5×5 pixel matrix is formed by simulating a shift register that holds four lines (640×4=2560 pixels) and also the five latest pixels of the serial data. In the preferred embodiment, which is used primarily in the reading of checks and other bank documents, each line contains 640 pixels; however, the hardware may be manipulated to accommodate any size documents. Each pixel enters the matrix at the A1 position and is propagated through the A2, A3, A4, and A5 positions, as shown in FIG. 3. From the A5 position, the bit is clocked into a shift register 30, containing 636 bits, the last bit of which constitutes the B1 position in the matrix. This shift register causes a one line delay of the pixel, so that as each pixel moves through the matrix, its relative position to other pixels in the real image remains the same. From the B1 position, the pixel is clocked through B2, B3, B4, and B5 positions, and into a shift register 32, a 636 bit device, the last bit of which constitutes the C1 position.

This pixel continues through positions C1–C5, shift register 34, positions D1–D5, and shift register 36 in the same manner as previously described. When the pixel is outputted from position E1, which is the last bit of shift register 36, the pixel is outputted to the compression hardware, and is also transmitted to position E2, to be used in the matrix. From position E2, the pixel propagates through E3, E4, and E5, which position is the last in the matrix.

The 25 pixel positions of the 5×5 matrix of FIG. 3 are applied in parallel to the inputs of an FPLA array which has been programmed to compare each input window pattern against a set of masks to determine how the pixels in the window should be altered to suppress noise. The contents of each window pattern is compared to all masks simultaneously by the FPLA array, which outputs signals to alter any pixels which are deemed to be erroneous.

The masks can be classified as to their function: (1) to remove single isolated points; (2) to remove two isolated points of any rotation; (3) to remove three isolated points of any rotation; (4) line edge cleaning; (5) line edge filling; (6) corner enhancement; and (7) special cases. By successive masking operations, special cases of double hole filling and character reconstruction may be accommodated.

In the present embodiment, 10 basic mask types are used to cover all cases except special cases and unit pixel removal. There are four rotations of each mask, necessitating 40 different masks. In addition, there are two fundamental masks to remove or set a discrete bit, for a final total of 42 masks.

Although the pixel matrix of window memory unit 10 (FIG. 1) is actually arranged according to FIG. 2, the matrix is considered to be conventionally labelled as shown in FIG. 4 for convenience. This conventional change must be remembered when analyzing the unit function or special masks of only one orientation when coded into the FPLAs.

FIG. 5 displays the different symbols used in interpreting the mask set of the preferred embodiment. Referring now to FIG. 5, symbol 40 represents a dark or "active" pixel in each of the masks. Symbol 42 represents a dark pixel which is to be inverted to a light pixel, while symbol 44 represents a light pixel which is to be inverted to a dark pixel. Symbol 46 represents a condition where it is immaterial whether the pixel is light or dark, a "don't care" condition.

Figure 6A:
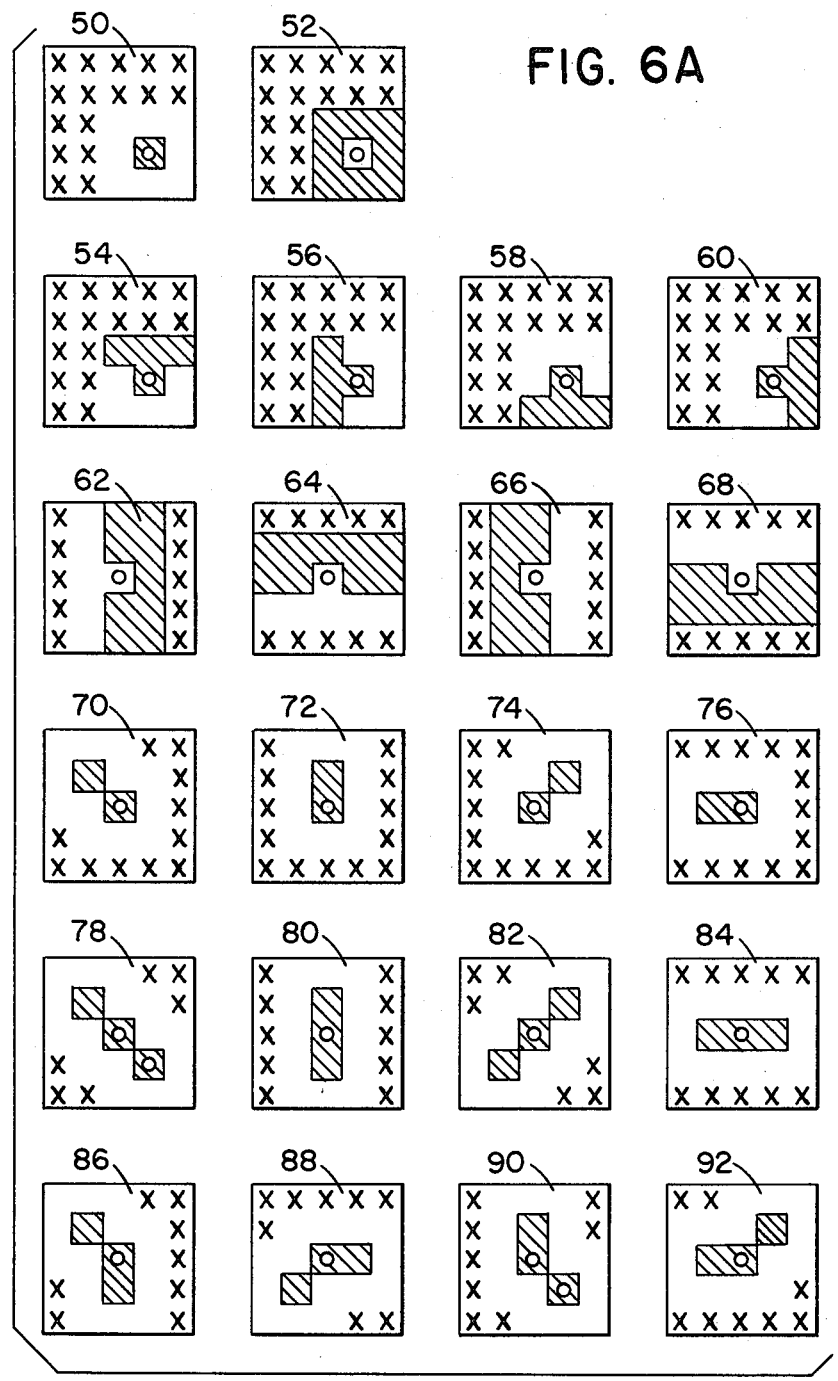
FIGS. 6A and B together show the mask set used in the preferred embodiment of the present invention.

FIGS. 6A & B, inclusive, depict the set of masks contained in the mask logic 12 (FIG. 1) which were developed for the present embodiment. It should be noted that this set of masks was derived experimentally for use on a certain type of two dimensional digital images (checks). Other types of image patterns could be better serviced by a different set of masks, or further experimentation may provide a different set which exhibits improved compression performance.

Referring now to FIGS. 6A and B, masks 50 and 52 are fundamental masks used for isolated unit pixel removal and addition. Mask 50 operates to remove a single dark pixel from a light area of the image. Mask 52 fills a hole created by a missing pixel in the center of a dark area on the image. Masks 54 through 68, inclusive, perform edge cleaning functions upon the characters contained in digital images. Mask 54 through 60, inclusive, operate to remove an unwanted pixel from the edge of pixel group, while masks 62 through 68, inclusive, insert a missing pixel into a group of pixels. Masks 70 through 76, inclusive, act upon isolated two pixel groups of noise, while masks 78 through 116, inclusive, perform pixel removal in cases involving isolated three pixel groups of various orientations. Masks 118 through 132, inclusive, involve corner enhancing operations, with masks 118 through 124, inclusive, acting to remove an extra pixel on an inside corner of a figure, while masks 126 through 132, inclusive, add a missing pixel to an outside corner of a figure.

An examination of masks 50 through 132, inclusive, reveals that matrix positions C3 and D4 are the only points where inversion control is required for the 42 basic masks of the present embodiment. Any pixel which is erroneous will be altered when it reaches one of these two matrix positions.

FIG. 7 shows several examples of the operation of the mask set contained in the mask logic 12 (FIG. 2) of the present embodiment in the removal of noise. A three pixel group representing noise is shown at frame 150*a*. As this pixel group travels through the window matrix of unit 10 (FIG. 2) in the manner shown in FIG. 3, the pixel group moves to the position shown in frame 150*b* when the next pixel enters the matrix. As the data in the matrix is applied to the mask logic 12, mask 106 (FIG. 6B) removes the pixel at position C3 in the matrix. As the next pixel enters the matrix, the pixel group (now containing only two pixels) is again shifted one line downward to the position shown in frame 150*c*. By applying mask 76 (FIG. 6B) to the matrix, the pixel at position C3 in the matrix is removed. In the frame 150*d*, which frame shows the remaining pixel after 1281 additional pixels have entered the matrix, the final pixel remaining in the three pixel group is removed in position D4 by applying mask 50 (FIG. 6A) to the matrix.

Figure 6B:
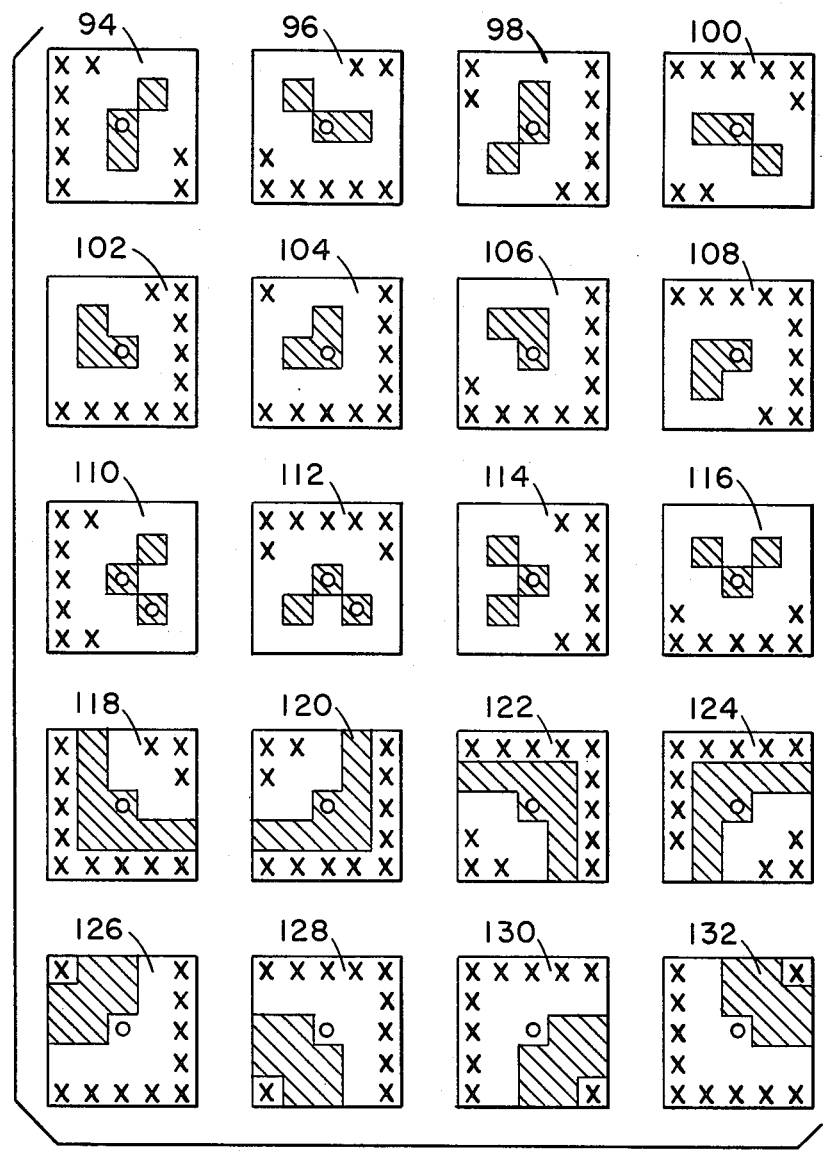

Another example of noise removal is shown in frames 152*a–d* of FIG. 7. Frame 152*a* shows a different three pixel configuration (representing noise) in the window matrix of unit 10 (FIG. 1). As the next pixel enters the matrix, the configuration is shifted downward one line in the matrix to the position shown in frame 152b, allowing one pixel to be removed at position C3 using mask 96 (FIG. 6B). As the next pixel enters the matrix, the two remaining pixels are shifted downward one line to the position shown in frame 152c, and, using mask 50 (FIG. 6A), the pixel at position D4 is removed. When the remaining pixel arrives at the position D4 shown in frame 152d (after 1281 additional pixels have entered the matrix), it is removed by mask 50 (FIG. 6A), and the three pixel group is thus completely eliminated from the image.

Figure 8C:
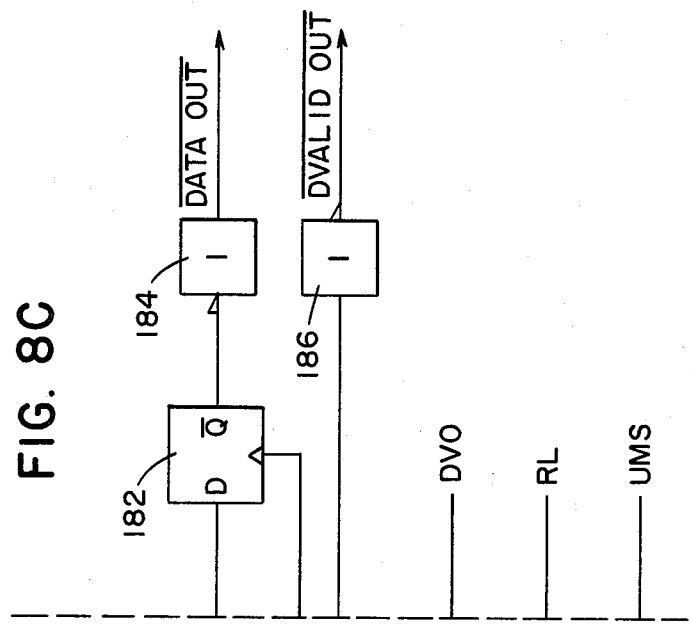
FIGS. 8A-C, inclusive, taken together, show the logic circuitry for the window memory unit (FIG. 1) used in the preferred embodiment.
Figure 8A:
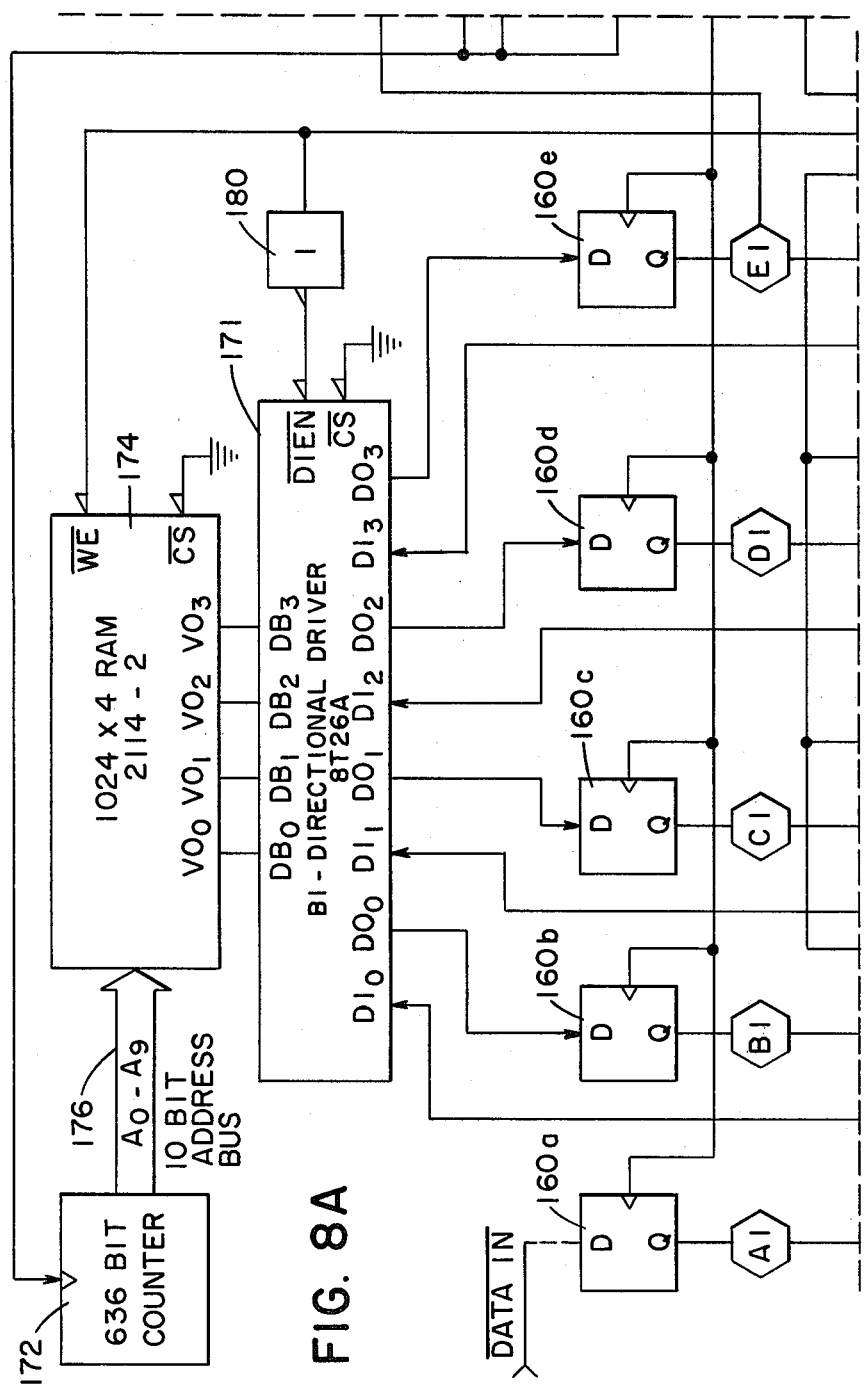
Figure 8B:
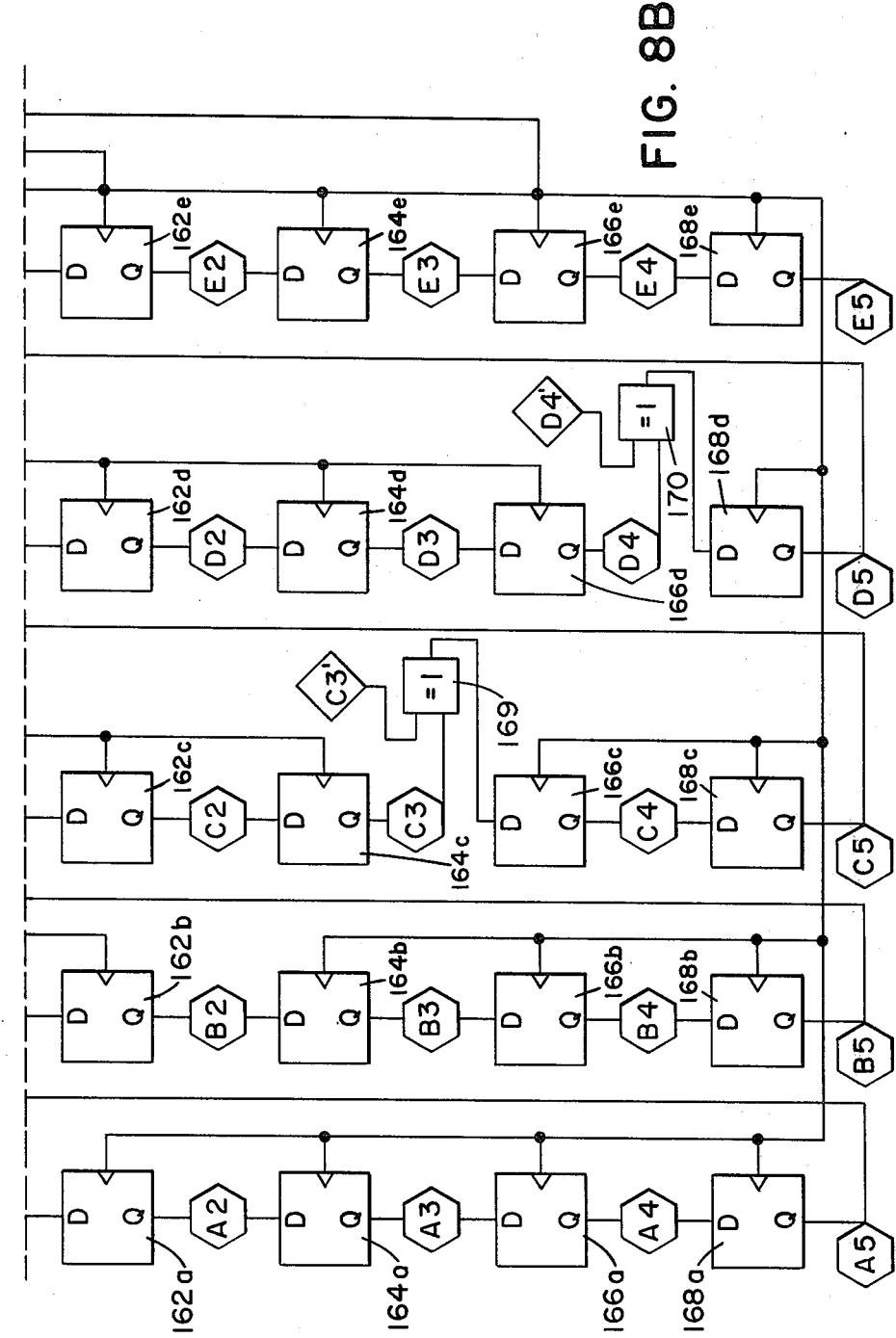

FIGS. 8A-C, inclusive, shows in detail the logic circuitry for the window memory unit 10 shown in FIG. 1. Referring now to FIGS. 8A and B, the 5×5 matrix is comprised of an array of D-type flip-flops, 160a-e through 168a-e, inclusive, which are arranged to simulate the matrix window. The outputs of the twenty-five flip-flops, which outputs are represented by hexagons A1-A5 through E1-E5, inclusive, are tapped and outputted to the mask logic circuitry 12 (FIG. 1). Matrix window position C3, which is the output of flip-flop 164c, is combined with a data bit C3', which represents a "cleaned" pixel outputted from the mask logic circuitry 12, via an EXCLUSIVE OR gate 169. The output of gate 169 is transmitted to flip-flop 166c. Similarly, matrix window position D4, which is the output of flip-flop 166d, is combined with data bit D4', representing another "cleaned" data bit from the mask logic, via an EXCLUSIVE OR gate 170. The output of gate 170 is transmitted to flip-flop 168d. Gates 169 and 170 operate to update the window matrix with corrected pixels. By using an EXCLUSIVE OR gate, a logic 1 outputted from the mask logic operates to invert the original data pixel, causing a blank to become a dot or a dot to become a blank on the digitized image.

Flip-flops 160a-e, inclusive, together form the top line of the 5×5 matrix window. Each of the flip-flops 160b-e receives an input from a bidirectional driver 171, which may be a 8T26A integrated circuit chip manufactured by Signetics, or an equivalent device. A fixed count length synchronous counter 172, the operation of which will be subsequently described in detail, provides addressing to a 1024×4 bit random access memory (RAM) chip 174 for simulating a set of four 636 bit shift registers, as is shown in FIG. 3. In the present embodiment, chip 174 is a 2114-4 Random Access Memory chip manufactured by Intel Corp, or an equivalent device. In operation, a count of 635 is decoded by counter 172 and enables a synchronous loading to zero on the next clock pulse, which totals 636 counts. The output data from counter 172, which comprises a 10 bit address bus 176, addresses RAM 174, transmitting the corresponding RAM output to flip-flops 160b-e via driver 171.

Flip-flops 160a-e are clocked by a signal RL, while flip-flops 162a-e through 168a-e, inclusive, are clocked by a signal UMS. The generation of these signals will be described in detail subsequently. Signal UMS also is transmitted to the write enable ($\overline{WE}$) port of RAM 174, and to the data in enable ($\overline{DIEN}$) port of driver 171 via an inverter 180. In operation, the data is clocked through the window matrix formed by flip-flops 160a through 168e, inclusive, in the manner shown in FIG. 3.

As each of the "cleaned" pixels is clocked out of flip-flop 160e to matrix position E1, that pixel is transmitted to a flip-flop 182, which flip-flop is clocked by a signal DVO. The output of flip-flop 182 is inverted by an inverter 184 to generate a $\overline{DATA\ OUT}$ signal. This signal is then transmitted to the data compression hardware (not shown). Signal DVO is transmitted to an inverter 186 to generate a $\overline{DVALIDOUT}$ signal.

Figure 9:
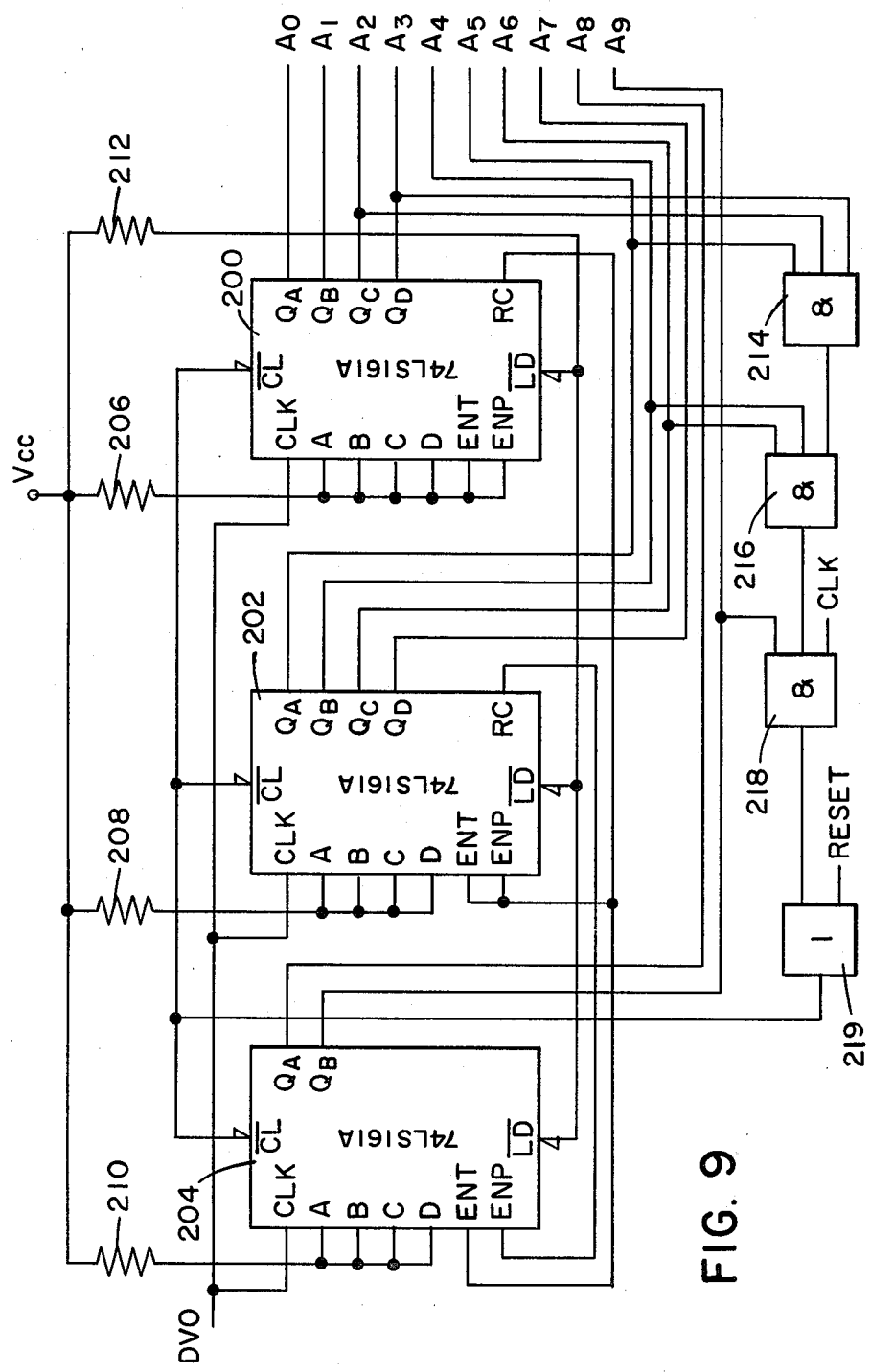
FIG. 9 shows the logic circuitry for the counter of FIG. 8A.

The logic circuitry for counter 172 is shown in detail in FIG. 9. Referring now to FIG. 9, counter 172 is comprised of synchronous binary counters 200, 202, 204, which may be of the type 74LS161A manufactured by Texas Instruments, or an equivalent device. The data input ports A, B, C and D of counter 200 are connected to the supply voltage $V_{cc}$ via a resistor 206, as are both enable inputs ENT and ENP. Data output ports $Q_A$, $Q_B$, $Q_C$ and $Q_D$ are connected respectively to the $A_0$, $A_1$, $A_2$, and $A_3$ lines of the address bus 176. The ripple carry output RC of counter 200 is connected to the enable inputs ENT and ENP of counter 202, and also to the enable input ENT of counter 204. The data input ports A, B, C and D of counter 202 are connected to supply voltage $V_{cc}$ via a resistor 208, while the data output ports are connected respectively to the $A_4$, $A_5$, $A_6$ and $A_7$ lines of address bus 176. The ripple carry output RC of counter 202 is connected to the enable input ENP of counter 204. The data input ports A, B, C and D of counter 204 are connected to the supply voltage $V_{cc}$ via resistor 210, while the data output ports $Q_A$ and $Q_B$ are connected respectively to address lines $A_8$ and $A_9$ of address bus 176.

The load input $\overline{LD}$ of counters 202, 203, and 204 are all connected to supply voltage $V_{cc}$ via a resistor 212, while the counters are all clocked by the signal DVO.

Address lines $A_2$, $A_3$, and $A_4$ are combined by and AND gate 214, while the output of gate 214 is combined with address lines $A_5$ and $A_6$ via an AND gate 216. The output of gate 216 is combined with address line $A_9$ via an AND gate 218. The output of gate 218 is connected through an OR gate 219, to which a RESET signal is also applied, to the clear inputs $\overline{CL}$ of counters 200, 202, and 204.

In operation, each pulse of DVO increments counter 172 once, causing its output, which is address bus 176, to address RAM 174. When the count reaches 636 (1001111100 in binary notation), address lines $A_2$, $A_3$, $A_4$, $A_5$, $A_6$ and $A_9$ are active, enabling gates 214, 216, 218, and 219, clearing registers 200, 202, and 204, and resetting counter 172 to zero.

Figures 10, 14:
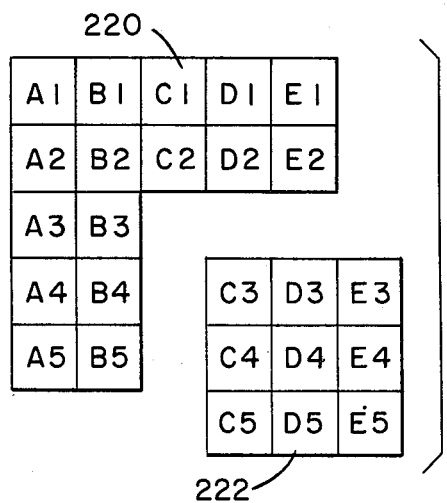
FIG. 10 is a diagram showing the separation of the pixel matrix shown in FIG. 4 for the purpose of generating two separate types of logic masks.
FIG. 14 is a chart listing the contents of the Read Only Memory (ROM) chip of the state controller of FIG. 13.

To code the 25 inputs of the 5×5 pixel matrix, the matrix contained in window memory unit 10 is split into two sub-masks, 220 and 222, as shown in FIG. 10, with one sub-mask forming an input for the other. Sub-mask 220, also designated as FPLA1, is termed a "corner" mask, while sub-mask 222, designated as FPLA2, is known as a "square" mask. By referring to FIG. 10, it can be determined which pixel positions are contained in FPLA1 and FPLA2. FPLA1 uses a greater number of inputs than FPLA2 from the matrix window 10 to provide output encoding lines which identify to the subsequent FPLA2 what particular conditions of the corner mask have been handled by FPLA1. These output lines transmit signals to FPLA2 which are combined with the remaining pixel position values to generate a control output. The interconnection between FPLAs 220 and 222 is shown clearly in FIG. 11.

Figure 11:
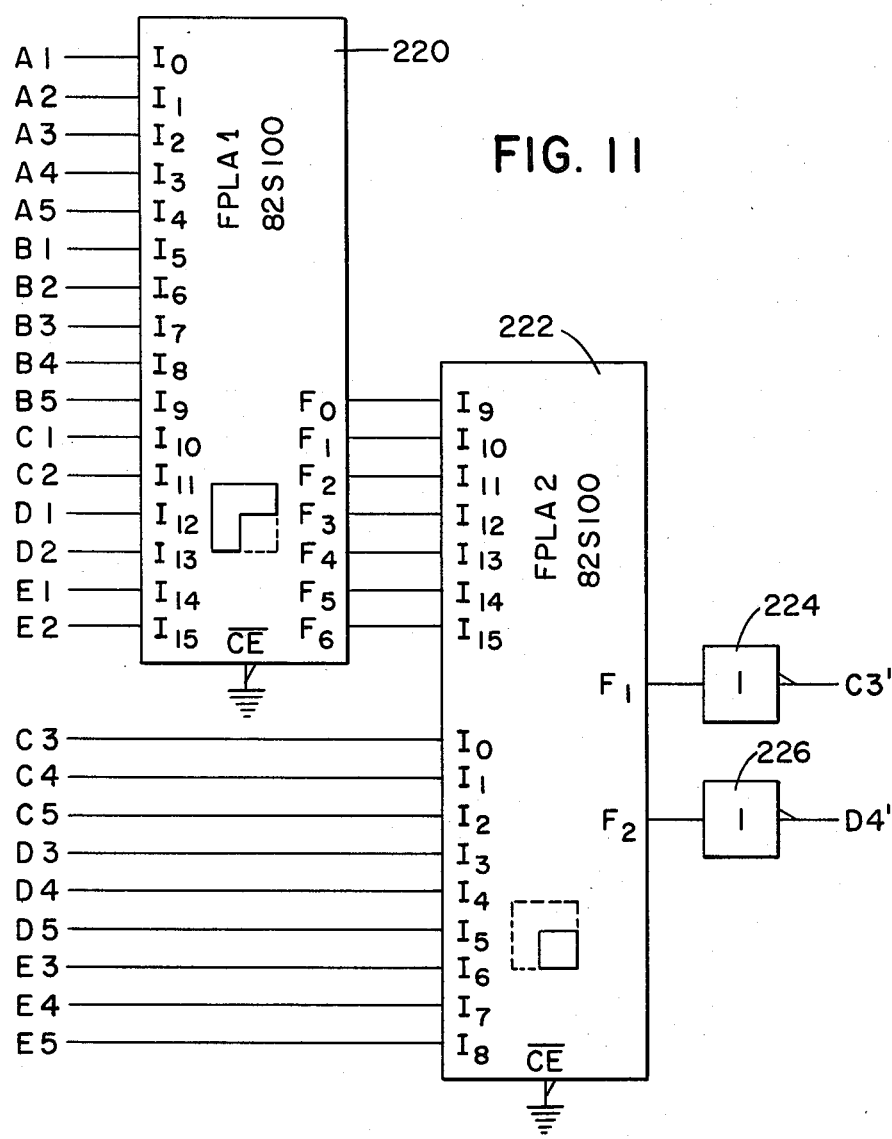
FIG. 11 shows the logic circuitry for the mask set of the preferred embodiment.

Referring now to FIG. 11, sixteen pixel positions from the window matrix of unit 10 (A1-A5, B1-B5, C1, C2, D1, D2, E1, E2) are used as inputs to FPLA1, and the nine remaining positions (C3, C4, C5, D3, D4, D5, E3, E4, E5) are used as inputs to FPLA2, while seven of the outputs of FPLA1 ($F_0$–$F_6$) are used as additional inputs to FPLA2. With seven lines $F_0$–$F_6$ interconnecting FPLA1 and FPLA2, $2^7$ or 128 unique equations may be employed in the preferred embodiment. However, as a practical matter, this number will not be attainable due to "don't care" conditions when coding the corner masks in FPLA1.

The output line $F_1$ of FPLA2 is passed through an inverter 224 to produce a signal C3', which is a control signal applied to gate 169 (FIG. 8B) to "clean" pixel C3. Similarly, output line $F_2$ is passed through an inverter 226 to produce a signal D4', a control signal applied to gate 170 (FIG. 8B) to clean pixel D4.

The encoding of the mask equations for FPLAs 220 and 222 requires considerable care to avoid conflicts. Due to the fact that many different square masks may exist for each corner mask, it is imperative that the output chosen for each corner mask is unique. FIG. 12 shows several examples for the coding of the FPLAs to provide certain of the masks employed in the present embodiment. In the chart in FIG. 12, L represents a low level or white pixel, H represents a high level or black pixel, —represents a "don't care" condition, and A represents that the output is active (low).

Referring now to FIG. 12, it can be seen that the contents of FPLA1 for coding the corner masks for masks 70 and 78 (FIG. 6A) are identical. As a result, only one output ($F_0$) is active under this particular condition. The choice of this output is arbitrary; however, this output must remain unique for this corner mask configuration. Another example of this duplication of corner masks can be seen by comparing mask 74 (FIG. 6A) with mask 110 (FIG. 6B).

When all of the existing corner mask configurations have been given a unique output value (using $F_0$ through $F_6$) in FPLA1, then the square masks can be encoded in FPLA2. Referring again to FIG. 12, the FPLA2 coding for the several masks (for which the FPLA1 coding is shown) is listed. As shown in FIG. 12, the only outputs which need to be coded are those representing positions C3 and D4 in the window matrix. These outputs are assigned using the desired outputs and need not be unique.

Figure 13:
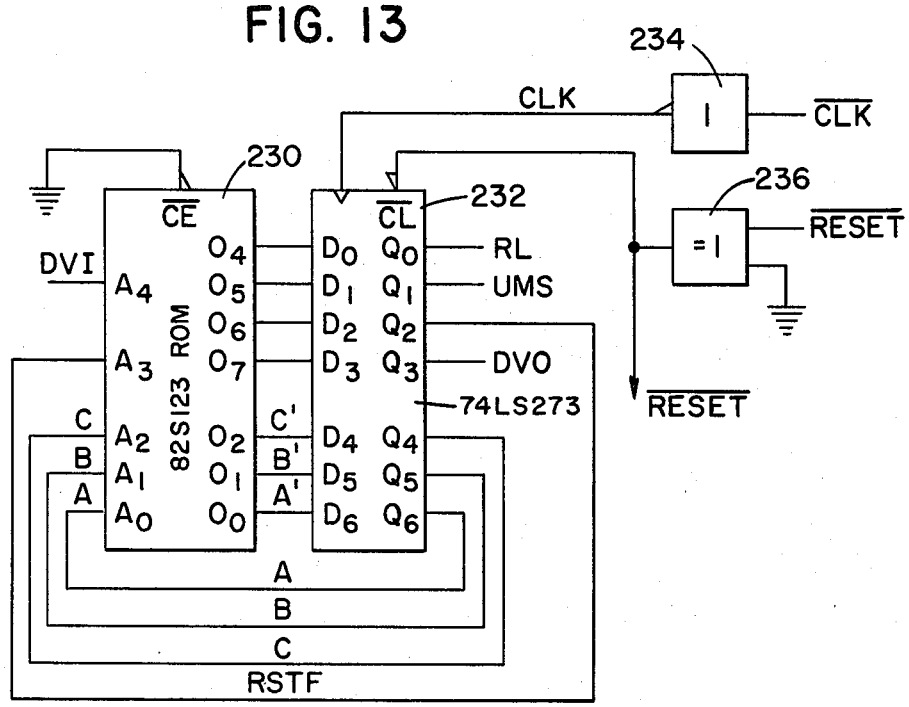
FIG. 13 shows the logic circuitry for the timing and logic control 14 (FIG. 1) used to control the present invention.

The operation of the noise cleaner apparatus is controlled by a timing and control logic unit 14 (FIG. 1), which unit is actually a state controller operated by a Read Only Memory (ROM) circuit chip which has been programmed to sequence through an eight step operation. FIG. 13 shows the circuitry used for the controller.

Referring now to FIG. 13, the input address lines $A_0$, $A_1$, and $A_2$ of a ROM 230 indicate the present state of the controller and are labelled A, B, and C respectively. In the present embodiment ROM 230 is a 82S123 Read Only Memory circuit chip manufactured by Signetics, but may be any equivalent device. The $A_4$ input is activated by a signal DVI, which indicates that a valid bit of data has been inputted into the noise cleaner. The chip enable input $\overline{CE}$ of ROM 230 is connected directly to ground.

ROM 230 has its output lines connected to the inputs of a D-type flip-flop array 232. Output lines $O_0$, $O_1$, and $O_2$ represent the next state of the controller and are labelled A', B', C' respectively. The signals on the output lines are clocked into flip-flop 232 by a signal CLK, which signal is generated when a signal $\overline{CLK}$ is transmitted through an inverter 234. The clear input $\overline{CL}$ of flip-flop 232 is controlled by a signal $\overline{RESET}$, which is inputted into an EXCLUSIVE OR gate 236, the remaining input of which is connected directly to ground.

Flip-flop 232 generates several signals which are employed to operate the logic circuitry of the noise cleaner (shown in FIGS. 8A-C): Signal RL, which clocks flip-flops 160a–e, signal UMS which allows for FPLA decoding and matrix updating, and signal DVO, which indicates that a valid bit of data is being outputted. A signal RSTF is also generated by flip-flop 232, which signal is used as a flag to prevent a false DVO signal when a DVI signal is active for the initial time. RSTF is fed back to the $A_3$ input of ROM 230. In addition, the signals representing the state count, A, B and C, are fed back to inputs $A_0$, $A_1$, and $A_2$ respectively of ROM 230 to allow generation of the next state. The chart displayed in FIG. 14 lists the outputs of flip-flop 232 with respect to the signals inputted to ROM 230.

Figure 15:
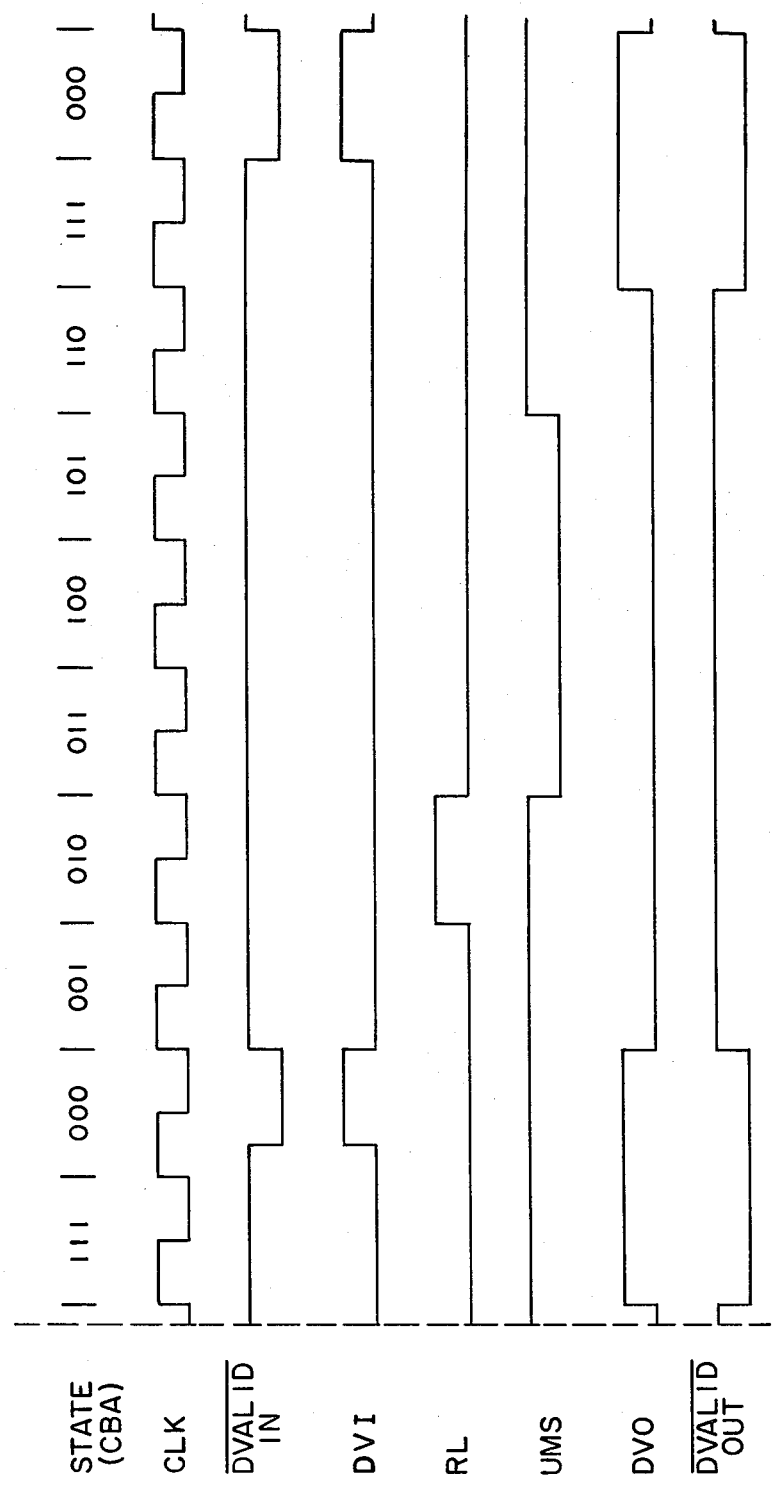
FIG. 15 is a timing diagram useful in explaining the operation of the preferred embodiment of the present invention shown in FIGS. 8A-C.

The operation of the circuit of FIGS. 8A-C can be best understood with reference to the timing diagram shown in FIG. 15. In FIG. 15, waveforms are displayed for the control signals CLK, $\overline{DVALIDIN}$, DVI, RL, UMS, DVO, and $\overline{DVALIDOUT}$ with respect to an eight-state sequence generated by the state controller shown in FIG. 13.

The next operating cycle of the noise cleaner begins when counter 172 (FIG. 8A) is incremented by a positive DVO pulse during the final state (111) of the previous eight-state sequence. The DVO signal remains at a positive level until a positive DVI pulse is received by the state controller (FIG. 13), indicating that a new data pixel has been received by the noise cleaner circuitry. The state controller must be in state 0 (000) before it will recognize a positive DVI pulse. The state controller is then incremented to state 1 (001).

Upon the next rising edge of the clock signal CLK, the controller increments to state 2 (010), and a positive RL pulse is outputted from flip-flop 232 (FIG. 13), which signal clocks the new data pixel into flip-flop 160a, and also clocks the data from output ports $DO_0$–$DO_3$ of driver 171 (which data represents the 636th storage element in each line of the digital image) into flip-flops 160b–160e. The following rising CLK pulse causes a negative transition of the RL signal, and also of the UMS signal. This transition causes the data from flip-flops 168a–e (the bottom line in the matrix window) to be transmitted to RAM 174, as the bi-directional driver 171 is reversed by the UMS signal via inverter 180. The data is written into the RAM at the same memory location which had just previously stored the data now stored in flip-flop 160b–e.

At this point, the 25 flip-flops representing the positions of the window matrix contain data to be examined by the mask set. Allowing time for the data from RAM 174 to settle, FPLAs 220 and 222 (FIG. 11) start valid decoding and update the serial data stream at points C3 and D4 via EXCLUSIVE OR gates 169 and 170, if necessary.

With the rising edge of the UMS signal, the altered pixels are latched into flip-flops 166c and 168d as the entire flip-flop matrix is clocked. The RAM write cycle is now completed, and data has propagated to the next lower level in all columns. At this point, in state 6 (110), the top two rows of the matrix contain the same information.

Upon the next rising of the CLK signal, which is state 7 (111), the DVO signal goes positive, clocking counter 172. As was described in detail in the discussion of FIG. 9, counter 172 increments address bus 176, causing RAM 174 to update the data on outputs $VO_0$–$VO_3$, readying the noise cleaner for the next cycle. Signal DVO also clocks flip-floop 182, causing the data at the E1 position of the matrix window to be outputted via inverter 184 to the compression hardware on the DATAOUT line.

The next DVI pulse which is transmitted to the state controller ROM 230 restarts the eight-state cycle again.

While the invention has been shown and described in terms of a preferred embodiment thereof, it will be understood that this invention is not limited to this particular embodiment and that many changes and modifications may be made without departing from the true spirit and scope of the invention as defined in the appended claims.

We claim:

1. An apparatus for altering erroneous data elements generated by a thresholding operation during the scanning of a document to produce a facsimile image, comprising:

first means for receiving a plurality of data elements obtained by scanning said document, said first means including storage means for storing a specific number of said data elements at any particular time;

second means coupled to said first means for determining whether any of said data elements stored within said first means are erroneous and should be altered, said second means including means for selectively testing said stored data elements for errors, said testing means including multiple logic masks contained in a field programmable logic array device, said multiple logic masks being applied simultaneously to selectively test said stored data elements for errors;

third means, coupled to said first and second means, for altering any data elements which are deemed to be erroneous by said second means;

and control means, coupled to said first means, for generating a plurality of control signals for use in controlling the transfer of said data elements into and out of said first means.

2. The apparatus of claim 1, wherein:

said storage means includes a matrix through which data elements are shifted in a pre-defined pattern;

said field programmable logic array device tests the data elements in said matrix for errors, each time that the data elements are shifted, to determine whether any of the data elements in preselected first and second locations of said matrix are erroneous and should be altered; and said third means selectively alters, each time that the data elements are shifted, any of the data elements in said first and second locations which are deemed to be erroneous by said field programmable logic array device.

3. The apparatus of claim 1, wherein said multiple logic masks are implemented in first and second parts, said first parts being stored in a first field programmable logic array, and said second parts being stored in a second field programmable logic array.

4. The apparatus of claim 3, wherein said storage means includes a matrix through which said data elements are shifted in a pre-defined pattern.

5. The apparatus of claim 4 wherein:

said matrix has first and second portions and includes preselected first and second data element locations;

said first and second field programmable logic arrays respectively test the data elements in said first and second portions of said matrix, each time that the data elements are shifted, to determine whether the data elements in said preselected first and second data element locations of said matrix are erroneous and should be altered; and said third means selectively alters, each time that the data elements are shifted, any of the data elements in said first and second data element locations which are deemed to be erroneous by said field programmable logic array device.

6. The apparatus of claim 4, wherein said storage means further includes memory means for storing said data elements so that said data elements can be shifted through said matrix in a pre-defined pattern.

7. The apparatus of claim 6, wherein said first means further includes means for addressing said memory means.

8. The apparatus of claim 7, wherein said third means comprises a plurality of EXCLUSIVE OR gates.

9. The apparatus of claim 8, wherein said control means comprises a read only memory device.

10. A method for removing erroneous data elements generated by a document scanning operation to produce a thresholded facsimile image, said method comprising the steps of:

(a) receiving a single data element from a plurality of data elements generated by said scanning operation;

(b) storing said data element into a storage means, which may contain a specific number of data elements stored in a pre-defined pattern at any particular time;

(c) repeating steps (a) and (b) a sufficient number of times to load said storage means with the desired number of data elements to provide said pattern;

(d) examining the data elements stored in said pre-defined pattern by a simultaneous comparison of the data elements stored in said pattern with each of multiple masks contained in a field programmable logic array device to determine whether any of the data elements stored in said pattern are erroneous and should be altered;

(e) altering any data elements which have been deemed to be erroneous by logically combining said erroneous element with an associated control signal from said field programmable logic array device to reverse the state of said erroneous element; and (f) repeating steps (a) through (e) until all of the data elements generated by said scanning operation have been examined for errors.

11. A method for removing erroneous data elements generated by a document scanning operation to produce a thresholded facsimile image, said method comprising the steps of:

shifting a sequence of data elements generated by said scanning operation into a storage means and selectively through a matrix in said storage means at each clock time;

simultaneously comparing at each clock time the group of data elements in said matrix with each of multiple masks contained in a field programmable logic array device to determine whether any data element in at least one preselected location within said matrix is erroneous and should be altered; and altering at each clock time any data element in said at least one preselected location that has been deemed to be erroneous by said field programmable logic array device by logically combining any said erroneous data element with an associated control signal from said field programmable logic array device to reverse the state of said erroneous element.

12. The method of claim 11 wherein:

said comparing step includes the step of determining whether data elements in respective preselected first and second locations within said matrix are erroneous and should be altered; and said altering step includes the step of logically combining any of the data elements in said preselected first and second locations within said matrix that have been deemed to be erroneous by said field programmable logic array device with an associated one of two control signals from said field programmable logic array device to reverse the state of the associated said erroneous data element.

* * * * *